United States Patent [19]

Leker

[11] 4,075,843
[45] Feb. 28, 1978

[54] HYDRAULIC TRANSMISSION

[76] Inventor: Richard E. Leker, 520 N. 73rd St., Lincoln, Nebr. 68502

[21] Appl. No.: 729,895

[22] Filed: Oct. 6, 1976

[51] Int. Cl.² .................... F15B 15/18; F16H 39/46
[52] U.S. Cl. .................................... 60/487; 60/489; 91/499
[58] Field of Search ............... 60/487, 488, 489, 494, 60/445; 91/499, 486, 472; 74/664, 687, 720, 730

[56] References Cited

U.S. PATENT DOCUMENTS

| | | | |
|---|---|---|---|
| 2,907,230 | 10/1959 | Kollmann | 74/687 |
| 3,313,108 | 4/1967 | Allgaier | 60/464 |
| 3,362,161 | 1/1968 | Flint | 60/488 |
| 3,698,189 | 10/1972 | Reimer | 60/489 |

*Primary Examiner*—Edgar W. Geoghegan
*Attorney, Agent, or Firm*—Lowe, Kokjer, Kircher, Wharton & Bowman

[57] ABSTRACT

A hydraulic transmission operates throughout a continuous range between a neutral condition and a direct drive one to one ratio of input shaft speed to output shaft speed. The input shaft carries a rotor which provides a hydraulic pump for the input side of the transmission. Reciprocating pistons of the input pump move in camming fashion against an input side swash plate as the input shaft rotates. The fluid that is displaced in the input side pump is directed into an output side pump which is carried on the output shaft. Reciprocating pistons of the output pump are hydraulically forced against an output side swash plate to effect rotation of the output shaft. A sleeve and lever assembly controls the stroke length of the pistons of the input pump in order to vary its fluid displacement relative to that of the output pump, thereby varying the transmission ratio. Each swash plate presents a pair of flat camming surfaces which are angled relative to one another in order to maintain a balanced torque condition with respect to the transmission axis. In an alternative embodiment of the invention, the swash plates are carried on the respective shafts and the pumps are interlocked with one another for rotation in unison.

28 Claims, 8 Drawing Figures

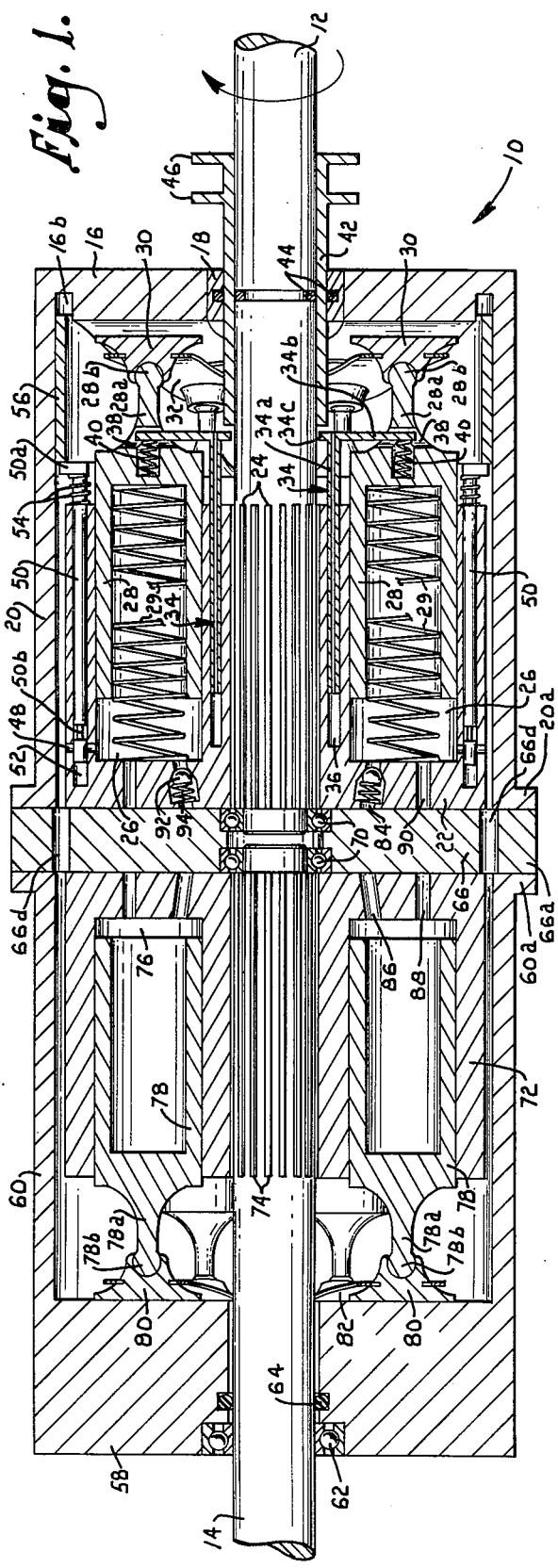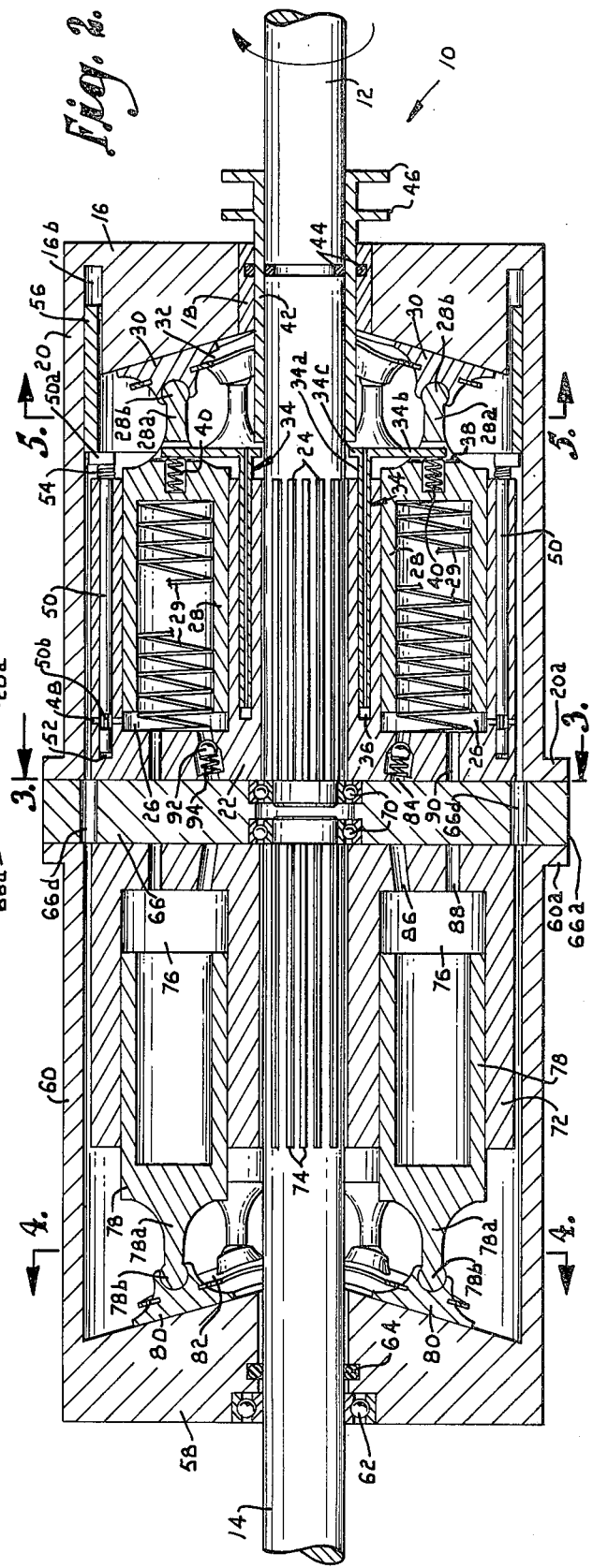

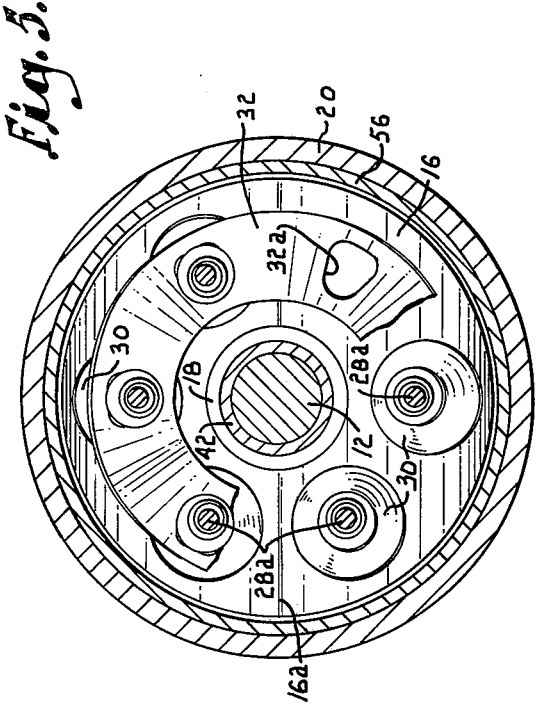
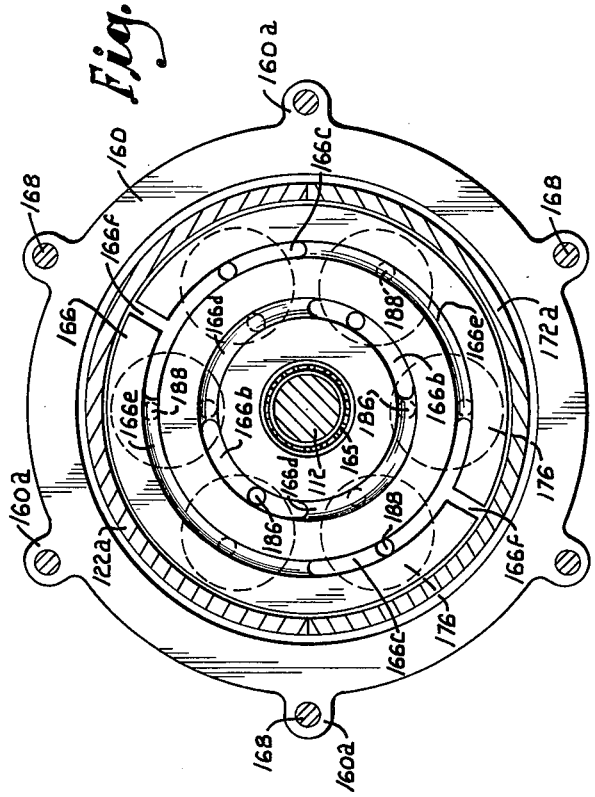
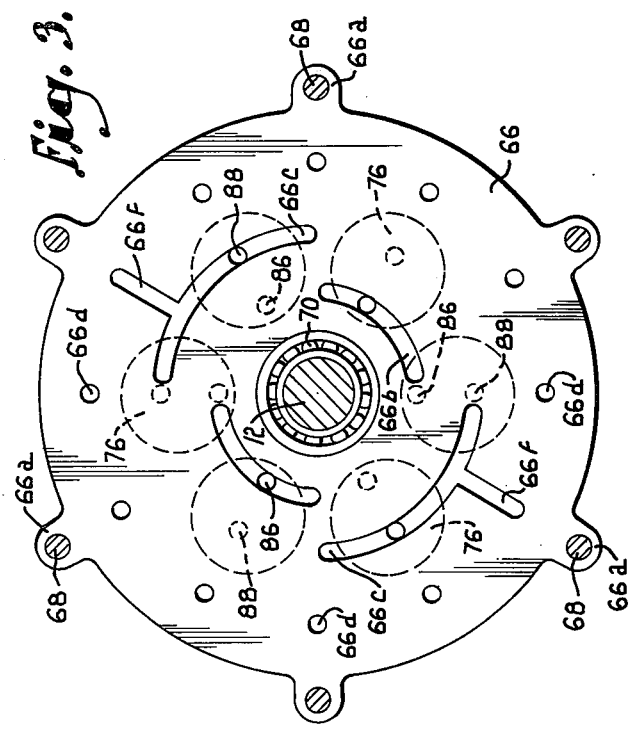
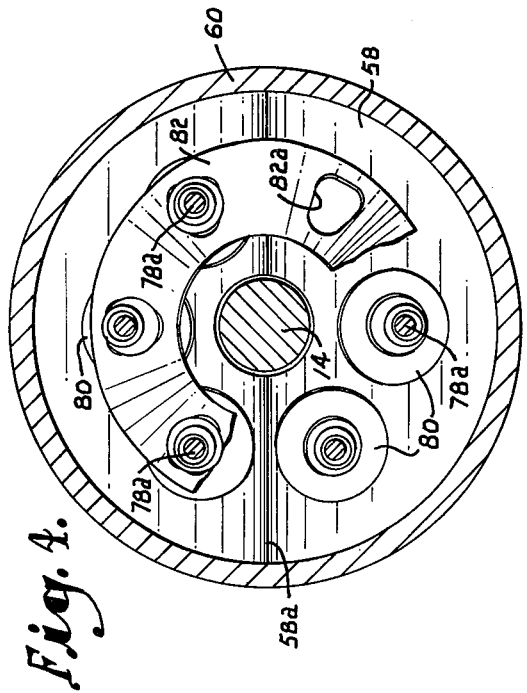

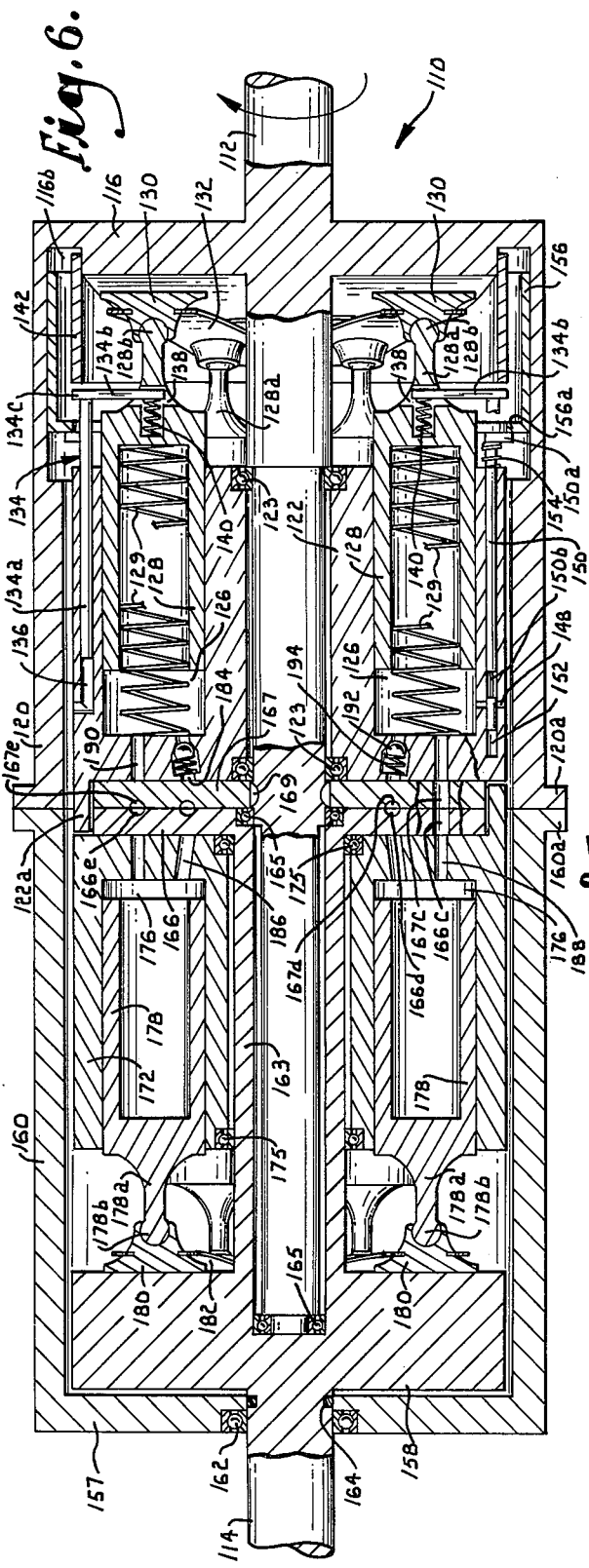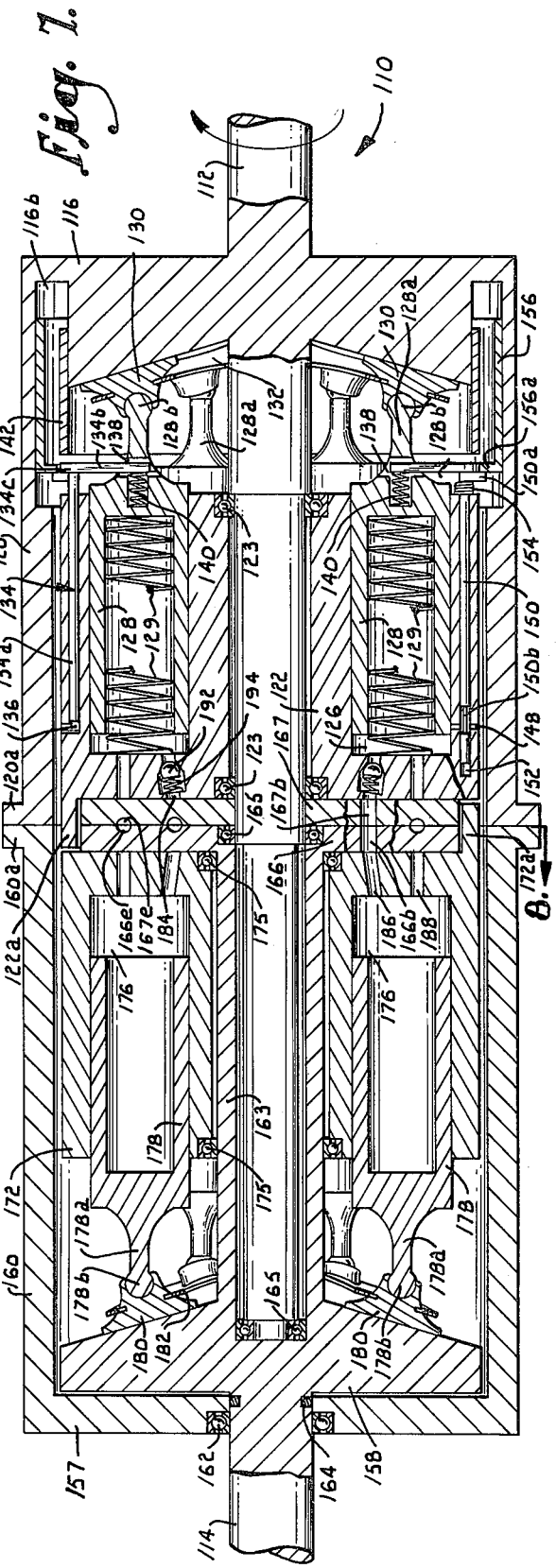

HYDRAULIC TRANSMISSION

BACKGROUND AND SUMMARY OF THE INVENTION

This invention relates to an improved hydraulic or hydromechanical transmission in which the transmission ratio is infinitely variable between a neutral condition and a direct drive condition.

Such transmissions are used in a wide variety of vehicles and other equipment which require changes in the ratio of input shaft speed to output shaft speed. The known prior art in this field is exemplified by the U. S. Pats to Lee Nos. 1,648,000, Creighton et al. No. 3,131,539, and Reimer No. 3,698,189. In each of these patents, a hydraulic pump unit and cooperating swash plate on the input side of the transmission interact to displace hydraulic fluid to an outside pump which in turn interacts with an output side swash plate in a manner to rotate the output shaft. The transmission ration essentially depends on the fluid displacement ratio of the two pumps.

While transmissions and torque converters of this type have been generally satisfactory in many applications, they have not been wholly free of difficulty. One major problem has been to provide a reliable means for smoothly and accurately adjusting the transmission ratio throughout a continuous range. This is normally done by varying the angle at which the swash plates are tilted and thus to change the relative displacement capacity of the two pumps. The main disadvantages of the conventional shifting arrangment is that the swash plates must be mounted in a manner to permit them to be tilted and held at varius angles. Of course, the necessity for mounting the swash plates such that they are tiltable significanly increases the complexity and cost of the transmission, as well as adding substantially to the maintenance requirements. Moreover, complicated mechanical linkages are required to move the swash plates in a manner to accurately adjust their tilt angle throughout a continuous range. Such tilting movement of the swash plates involves additional practical problems because considerable fluid pressure must be overcome and jerkiness in the shifting often results.

Other problems have been caused by the uneven torque conditions which are present in existing transmissions of this type. Since each swash plate typically presents a cam surface that lies in a single inclined plane, the forces caused by the pumping and driving action at any given time are concentrated on one side of the transmission axis, thus subjecting the shafts to excessive stress due to the uneven torque forces. For the same reason, the hydraulic fluid is distributed non-uniformly about the transmission axis, and its weight adds significantly to the unbalanced condition of the transmission. Manifestly, the uneven torque effects and unbalanced weight result in excessive wear on the shafts and other parts of the transmission.

Existing hydraulic transmission of this type are further characterized by a large number of parts which rotate relative to one another. Typically, the parts are located in a stationaly housing with the two pumps being rotatable relative to one another and the two swash plates being rotatable relative to one another and to the pumps. Accordingly, a large number of bearing, bushings, dynamic oil seals and the like are required, with corrresponding increases in the cost, complexity, and maintenance problems. It has not been possible in the past to provide transmission housings which rotate with the shafts because of the unbalanced weight problems previously pointed out.

It is primary object of the present invention to provide a hydraulic transmission which is improved over existing transmissions as to its construction and operating characteristics.

More specifically, an object of the invention is to provide a hydraulic transmission in which the transmission ratio may be varied continuously between a neutral condition and a direct drive, one to one correlation of input shaft speed to output shaft speed.

In conjunction with the preceding object, it is another object of the invention to provide an improved mechanism for adjusting the transmission ratio, which mechanism may be easily operated either manually or in automatic fashion such as electrically, hydraulically, or by means of vacuum. In this respect, the control sleeve and lever arrangement is of considerable significance in that it eliminates the necessity of mounting the swash plates for adjustable tilting as is done in the known prior art transmissions.

Still another object of the invention is to provide a hydraulic transmission which is uniquely constructed in order to achieve a balance of the torque forces and the fluid distribution with respect to the transmission axis. Such balancing is achieved through the use of swash plates which are shaped symmetrically with respect to the shafts.

Yet another object of the invention is to provide, in a hydraulic transmission of the character described, a variable displacement fluid pump in which the pumping capacity is varied by restricting the stroke length of the pumping elements.

A further object of the invention is to provide a hydraulic transmission of the character described in which virtually no pumping action or fluid displacement occurs at the direct drive condition. Accordingly, friction and other wear on the components is reduced since there is no relative motion between the parts at the high or one to one setting.

An additional object of the invention is to provide a hydraulic transmission which may be constructed either with both pumps interlocked for rotation in unison, or with both swash plates rigidly coupled for rotation together. In both embodiments, the number of parts that rotate relative to one another is reduced in comparison to existing transmissions, and the number of bearings and seals required is thus decreased.

Yet another object of the invention is to provide a hydraulic transmission of the character described which has a housing that rotates along with the remaining components, unlike prior art transmissions which have a stationarily mounted housing.

Still further object of the invention is to provide a hydraulic transmission which is relatively simple to assembly, which requires little maintenance, and which functions reliably over a long operating life.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a longitudinal sectional view taken centrally through a hydraulic transmission constructed according to a preferred embodiment of the invention, with the transmission in a high setting;

FIG. 2 is a sectional view similar to FIG. 1 but showing each swash plate rotated 90° from its FIG. 1 position, with the transmission in a neutral setting;

FIG. 3 is a view taken generally along line 3—3 of FIG. 2 in the direction of the arrows and illustrating in detail the plate valve;

FIG. 4 is a sectional view taken generally along line 4—4 of FIG. 2 in the direction of the arrows, with portions broken away for illustrative purposes;

FIG. 5 is a sectional view taken generally along line 5—5 of FIG. 2 in the direction of the arrows, with portions broken away for illustrative purposes;

FIG. 6 is a longitudinal sectional view taken centrally through a hydraulic transmission constructed according to an alternative embodiment of the invention, with the transmission in a high setting;

FIG. 7 is a sectional view similar to FIG. 6 but showing each of the swash plates rotated 90° from the FIG. 6 position, with the transmission in a neutral setting; and FIG. 8 is a cross sectional view taken generally along line 8—8 of FIG. 7 in the direction of the arrows.

Referring now to the drawings in detail and initially to FIGS. 1 and 2, reference numeral 10 generally designates a hydraulic or hydromechanical transmission which is constructed according to a preferred embodiment of the invention. The transmission 10 transfers power in a variable ratio from an input shaft 12 to an output shaft 14 which is axially aligned therewith. In a normal application, the input shaft 12 is driven rotatively by an engine or other power source (not shown).

The input shaft 12 extends through a central opening in a solid swash plate 16 which forms the end portion on the input side of the transmission. A bearing or journal 18 supports shaft 12 for rotation relative to the swash plate 16. A cylindrical housing section 20 for the input side of the transmission is formed integrally with swash plate 16 in extension from the periphery thereof. Section 20 is concentric with shaft 12.

The configuration of swash plate 16 is important to the invention, as will become clear. The swash plate has a circular periphery, and its interior face presents a pair of flat cam surfaces which re semicircular in shape and which are located on opposite halves of a diameter line 16a (see FIG. 5). The cam surfaces are angled relative to one another and meet at the diameter line 16a. Consequently, the swash plate is symmetrical about line 16a, with low points located at the left and right on line 16a and high points located at the top and bottom, as viewed in FIG. 5.

Within housing section 20, the input shaft 12 carries a cylinder head or rotor 22 which serves as a hydraulic pump housing on the input side of the transmission. A plurality of keys 24 rigidly on shaft 12 for rotation therewith. In the preferred embodiment, six uniformly spaced cylinder bores 26 are formed in rotor 22 from the right end thereof. The bores are arranged in a circular pattern which is centered at shaft 12. Each bore 26 is cylindrical in shape with its axis oriented parallel to that of shaft 12. A piston 28 is received in each bore 26 to slide axially therein in reciprocating fashion. A compression spring 29 is fit in a large cavity which is formed in the back portion of each piston 28. Springs 29 continuously urge pistons 28 to the right as viewed in FIGS. 1 and 2, or in a direction out of the bores.

The end of each piston which projects out of its bore is provided with a reduced diameter neck portion 28a which carries an integral ball 28b on its end. Each all 28b in turn carries a friction shoe or pad 30 which has a socket connection permits each pad 30 to rotate and to flex in all directions as it moves along swash plate 16. Each pad 30 has a flat, circular, low friction surface that is able to ride along the flat cam surfaces of the swash plate.

Referring additionally to FIG. 5, a stabilizing ring 32 interconnects the six friction pads 30 in a manner to orient them properly as they move into and out of contact with swash plate 16. A thin annular groove in formed around each pad approximately midway between its low friction surface and its socket. Ring 32 has six generally oval shaped openings 32a (FIG. 5) which register with the respective grooves in order to connect the ring with each of the pads. Openings 32a are not exactly oval but are instead enlarged somewhat in wedge shaped fashion as they extend outwardly on the ring. This shape of the openings, along with their relatively loose fit with grooves in pads 30, allows the pads to wobble or flex about balls 28b and also to rotate relative to ring 32. The enlarged outer portions of openings 32a provide the pads with sufficient play to move from side to side slightly as they ride along intermediate parts of the swash plate.

Ring 32 is a thin, flat member which is resilient so as to accommodate movement of each pad 30 along the cam surfaces of plate 16. Due to its resiliency or tendency to straighten out, the ring urges each pad 30 toward an orientation approaching that of the immediately preceding pad. Thus, when rotor 22 is in rotation with one or more of the pads 30 out of contact with plate 16, the stabilizing ring 32 urges such pads toward the orientation of the pad which is immediately ahead in the direction of rotation. As will become clear, this action of the ring assists the pads in moving smoothly back into contact with the cam surfaces of plate 16.

A control lever 34 is operatively coupled with each piston 28 in a manner to control its stroke length. Each lever has an elongate base portion 34a which is received to slide back and forth in a guide channel 36 which is formed in rotor 22. Channels 36 are parallel to shaft 12 and are located between the shaft and the respective bores 26. The base 34a of each lever is bored to permit the passage of fluid therethrough. An arm portion 34b of each lever extends outwardly at a right angle from the end of base 34a and into a transverse opening 38 which is formed through each piston 28 at the base area of its neck 28a. Arm 34b fits rather loosely in opening 38, and a small compression spring 40 is fit in a recess of each piston with the spring acting against the arm 34b. Springs 40 thus continuously urge each of the control levers 34 to the right as viewed in FIGS. 1 and 2. Springs 40 are stronger than springs 29 to facilitate downshifting of the transmission, as will be explained in greater detail. It is contemplated that instead of fitting in openings 38 arm portions 34b may be constructed to encircle the necks 28a in order to link levers 34 with pistons 28 in an alternative manner.

A control sleeve 42 is fit slidably around shaft 12 and through swash plate 16 within the journal 18. O-rings 44 seal the sleeve with shaft 12 and with journal 18. The end of sleeve 42 which projects out of the transmission is provided with a pair of flanges 46 that form connections by which the position of the sleeve may be adjusted. The inner end of sleeve 42 contacts short stubs 34c which are formed on levers 34 as essentially inward continuations of arms 34b. Sleeve 42 thus acts to limit the extent to which levers 34 can move to the right, and the stroke length permitted each piston 28 is restricted accordingly. It is contemplated that sleeve 42 will be adjusted in position either electrically, hydraulically, mechanically, by vacuum, or in any other suitable manner.

A relief passage 48 leads outwardly from the base end of each bore 26 to the exterior of rotor 22. The flow of hydraulic fluid through each passage 48 is controlled by a valve in the form of an elongate rod 50. The rods are mounted to slide in channels 52 that intersect with passages 48. Each rod 50 ordinarily blocks its passage 48 to flow as shown in FIG. 1, being biased toward the closed position by a compression spring 54 which encircles the rod and bears against its enlarged head portion 50a. However, the rods each have a reduced diameter portion 50b, and they may be slid against the force of springs 54 to the position shown in FIG. 2 wherein portions 50b register with passages 48. The relief passages 48 are then opened so that fluid is able to bleed off from the bores 26.

Rods 50 are adjusted between the open and closed positions by a sleeve 56 which is fit against the cylindrical inner surface of housing section 20. One end of sleeve 56 is received in a groove 16b which is formed in swash plate 16 near its junction with housing section 20. The other end of the sleeve engages heads 50a of the valve rods. Sleeve 56 is concentric with shaft 12 and is able to slide in a direction parallel to the shaft axis in order to move rods 50 between their open and closed positions. The position at which sleeve 56 is held may be controlled in any desired manner such as electrically, by vacuum, by hydraulic pressure, or by means of a mechanical linkage.

Turning now to the details of the output side of the transmission, the output shaft 14 extends centrally through an opening in a solid swash plate 58 which is formed integrally with a cylindrical housing section 60 that is equal in size to housing section 20. A bearing 62 rotatably supports shaft 14 relative to swash plate 58, and an o-ring 64 provides a seal therebetween. The housing sections 20 and 60 are arranged generally end to end with a circular plate valve 66 positioned therebetween. Mating lugs 20a, 60a, and 66a of the respective housing sections and plate valve are interconnected, with lugs 66a located between lugs 20a and 60a. The lugs are connected by conventional fastening elements 68 (FIG. 3). The housing sections 20 and 60, swash plate 16 and 58, and plate valve 66 are thus all rigidly connected for rotation together. Shafts 12 and 14 are supported for rotation relative to plate 66 by bearings 70.

The configuration of swash plate 58 is substantially opposite or reversed as compared to that of swash plate 16, as best shown in FIG. 2. Thus, plate 58 presents on its interior face two flat cam surfaces which are each semicircular in shape. The cam surfaces are located on opposite sides of a diameter line 58a (FIG. 4). The cam surfaces of plate 58 meet on line 58a at an angle that is slightly greater than 180°, while the cam surfaces of plate 16 meet at an angle that is equally less than 180°. The cam surfaces of swash plate 58 are thus parallel to those of plate 16. As viewed in FIG. 4, the high points of plate 58 are at the left and right sides on the diameter line 58a, and the low points are at the top and bottom.

The hydraulic pump housing on the output side of the transmission is in the form of a cylinder head or rotor 72 which is substantially identical to rotor 22 but oriented oppositely. A plurality of keys 74 mount rotor 72 rigidly on shaft 14 at a location within housing section 60. Six cylindrical bores 76 extend into rotor 72 from the left end thereof, and each bore receives a piston 78 for reciprocating movement. Bores 76 are parallel with shaft 14 and are aligned with the bores 26 of the input side pump.

Each piston 78 has a reduced diameter neck portion 78a which projects out of the bore, and an integral ball 78b is formed on the end of each neck. Each ball 78b in turn carries a friction pad 80 which has a socket that receives the ball. Pads 80 are allowed to rotate about the ball and socket connection and to flex in all directions as their flat contact surfaces move along the cam surfaces of plate 58.

Pads 80 are coupled together by a resilient stabilizing ring 82 which is identical to the ring 32 described previously. Thus, ring 82 has six generally wedge shaped openings 82a (FIG. 4) which register with annular grooves in pads 80 in order to mount the ring. Ring 82 acts to properly orient those pads which are not of contact with plate 58 in much the same manner as described in connection with ring 32.

The pumps on the input and output sides of the transmission are connected with one another in a closed hydraulic circuit such that fluid that is displaced from one pump is forced into the other pump. Included in the hydraulic circuit are discharge passages 84 which lead through rotor 22 from the bores 26 thereof. An intake passage 86 leads through rotor 72 from each bore 76, and the end portions of the passages 84 and 86 are aligned, with the plate valve 66 located therebetween. Similarly, each bore 76 has a discharge passage 88 that is aligned with an intake passage 90 of the corresponding bore 26. Passages 88 and 90 are located outwardly of passages 84 and 86.

Each passage 84 angles inwardly relative to shaft 12 or toward the transmission axis as it extends away from its bore 26. A check valve comprising a ball 92 and spring 94 is disposed in each passage 84 to prevent fluid from entering bores 26 through the discharge passages. Each spring 94 urges its ball 92 to the right toward its valve seat, although fluid pressure in bore 26 acts to unseat the ball during the compression stroke of piston 28. It is significant that passages 84 are angled relative to the rotor axis because the centrifugal force applied to each ball when rotor 22 is in rotation cooperates with springs 94 in normally maintaining the balls firmly on their seats.

The plate value 66 controls the flow of fluid between the input and output pumps. As shown in FIG. 3, a pair of inner arcuate openings 66b are formed through valve plate 66 at locations to register with and interconnect passages 84 and 86 when the plate is in a suitable rotative position relative to the rotors. Openings 66b each extend through an arc slightly less than 90°, with the arcs centered at diametrically opposed locations on plate 66. A second pair of arcuate openings 66c are formed through the valve plate at locations outwardly of openings 66b and offset therefrom by 90°. Openings 66c each extend through an arc slightly less than 90°, and they are centered at diametrically opposed positions. With plate 66 suitably positioned, openings 66c provide communication between passages 88 and 90 so that fluid is able to flow from the output pump to the input pump.

The plate valve 66 is further provided with a series of openings 66d which allow fluid to move between the input and output sides of the transmission. Openings 66d are located to correspond with clearance spaces that are presented between rotors 22 and 72 and the respective housing sections 20 and 60, as best shown in FIGS. 1 and 2. Openings 66d provide communication between the input and output sides of the transmission so that hydraulic fluid can be circuited throughout the transmission for cooling, lubricating, or other purposes. The plate valve has an additional pair of passages 66f which extend between openings 66c and a pair of the openings 66d.

In operation, the input shaft 12 is normally driven by an engine (not shown) to rotate rotor 22. As pads 30 thus move along the cam surfaces of swash plate 16, the camming action provided by the swash plate causes pistons 28 to reciprocate in their bores 26. As the pistons move from the top of their stroke (FIG. 1) to the bottom of their stroke (FIG. 2), hydraulic fluid is pumped from the input side bores 26 to the output side bores 76, thereby extending pistons 78 and causing them to interact with swash plate 58 in camming fashion. This in turn effects rotation of the output side rotor 72 and the output shaft 14 to which it is connected.

The transmission ratio is determined by the relative fluid displacement of the input and output pumps. The output pump (rotor 72) is a fixed displacement pump, while the displacement of the input pump (rotor 22) may be varied according to the position of sleeve 42 (and levers 34) in order to vary the transmission ratio. FIG. 2 illustrates sleeve 42 set in a neutral position in which pistons 28 are unable to stroke at all and there is no power transmitted to the output shaft. When sleeve 42 is slid slightly to the right from the FIG. 2 position, pistons 28 are able to make relatively short strokes so that they force a small amount of fluid from the input pump to the output pump. Each input side piston 28 must make a number of relatively short strokes in order to pump sufficient fluid to move the corresponding output side piston 78 through a single long stroke, and the input shaft therefore must rotate a number of times to effect one rotation of the output shaft.

Continued movement of sleeve 42 to the right provides for increasing stroke length of pistons 28 until they are eventually allowed to move through their maximum stroke when sleeve 42 is set in the position of FIG. 1. This is the "high" setting of the transmission at which the output shaft speed equals the input shaft speed because the displacement of the two pumps is equal. At this setting of sleeve 42, the entire transmission (including housing sections 20 and 60) rotates as a unit and there is no pumping action or movement of fluid between the pumps since the pistons and swash plates are effectively locked in place relative to one another. Consequently, there is no power loss at the high setting due to friction or fluctuations in the fluid pressure. At intermediate settings of sleeve 42, the rigidly connected housing sections 20 and 60 rotate at a speed approximately midway between the speeds of shafts 12 and 14.

It is thus apparent that sleeve 42 and levers 34 act to restrict the stroke length of pistons 28 in a manner to control the transmission ratio in accordance with the setting of the sleeve. Since the sleeve has an infinite range of positions between the neutral and high setting, the transmission ratio is likewise infinitely variable.

The plate valve 66 controls the pattern of fluid flow such that it moves between the pumps in the proper manner. The check valves prevent fluid from flowing into bores 26 through the discharge passages 84 when the control sleeve 42 is at an intermediate setting. Since the pads 30 for some of the pistons 28 are than out of contact with swash plate 16, it would be possible for such pistons to have fluid pumped into their bores through discharge passages 84 by the leading or trailing pistons 28 on the same side, rather than or the fluid to be pumped to the output side pump as intended. However, the check valves prevent this from occurring because they allow fluid to flow through passages 84 in only one direction, i.e., out of bores 26. It is again noted that the centrifugal force of the rotating rotor 22 assists springs 94 in maintaining the valve balls 92 firmly against their seats.

The stabilizing rings 32 and 82 function to properly align pads 30 and 80 when sleeve 42 is in an intermediate setting. For example, when the stroke length of pistons 28 is restricted by the control sleeve in cooperation with levers 34, pads 30 are unable to reach the low points on swash plate 16. When each pad moves out of contact with the swash plate, it is angled in accordance with the incline of the cam surface along which it was previously moving. However, it must move back into contact with the swash plate against the oppositely angled cam surface thereof, and this would create considerably difficulty were it not for the stabilizing ring 32. The resiliency of the ring urges each pad that is out of contact with plate 16 toward the same orientation as the immediately preceding pad, and the latter is in contact with cam surface against which the trailing pad is to move. Consequently, the friction pads are properly aligned by the stabilizing ring in order to move smoothly and substantially flatly back into contact with the swash plate.

The small springs 40 assist in the movement of the control sleeve 42 to the left during downshifting of the transmission. The sleeve can be slid to the left against the force of springs 40 far enough to move each arm 34b against the left side wall of its opening 38 without encountering resistance from the fluid pressure in the input pump. During the next stroke of the piston 28, the force applied by spring 40 prevents the piston from returning as far to the right upon completion of the stroke. Therefore, sleeve 42 may be gradually moved to the left without having to overcome the pressure of the hydraulic fluid. It is noted that the loose fit of arms 34b in openings 38 permits the arms to move within the openings without resistance from the fluid pressure.

The fluid relief passages 48 facilitate downshifting of the transmission from the high or one to one setting of sleeve 42. As previously indicated, the entire transmission is rotating as a single unit at this setting of the sleeve and there is not pumping action or stroking of any of the pistons. Consquently, the fluid pressure must be relieved in the input pump bores 26 in order to permit movement of sleeve 42 to the left for a downshift. Prior to downshifting from high, sleeve 56 in slid to the position of FIG. 2 such that valve rods 50 open passages 48. Sleeve 42 may then be slid to the left to push the control levers 34 to the left since the fluid in bores 26 that would otherwise resist such movement is allowed to flow out through passages 48. Once the transmission has been downshifted from high and the pistons begin stroking, sleeve 56 is moved back to the FIG. 1 position wherein rods 50 prevent flow through passages 48. It should be evident also that the relief passages 48 may be opened to permit shifting to neutral when the transmission is not rotating at all, and that a faster and easier downshift from any position can be effected with passages 48 open than through the gradual movement of sleeve 42 described previously. Passages 66f (FIG. 3) provide access for additional fluid to the input pump when upshifting (as from neutral toward high), and they provide an escape for excess fluid from the output pump when downshifting (as from high toward neutral).

The provision of swash plates 16 and 58 which each present a pair of angled surfaces for interaction with pistons 28 and 78, respectively, causes each piston to make two strokes each time the swash plates make one relative revolution. Therefore, a greater pumping rate is achieved than with swash plates that have only a singly inclined surface. More importantly, the double cam surface configuration provides balanced pumping action about the axis of the transmission to avoid uneven torque effects on shafts 12 and 14, as well as excessive wear on other components. Since each swash plate 16 and 58 is symmetrical on opposite sides of the shafts, diametrically opposed pairs of pistons are always at the same stage of their stroke. The pumping action is thus equal on opposite sides of shafts 12 and 14, and the torque forces on the shafts are balanced out. In addition, the hydraulic fluid is distributed equally about the shafts so that the weight of the fluid is balanced. It is contemplated that the swash plates may have more than two relatively angled cam surfaces, although this adds to the complexity and expense.

It is contemplated that a conventional priming pump (not shown) may be provided to charge the bores 26 and 76, to circulate the fluid for cooling, lubrication, or other purposes, and to possibly operate sleeves 42 and 56 hydraulically. Such a pump would operate in a well known manner, and it could be located at any suitable position in the transmission, preferably on the input side.

FIGS. 6-8 illustrate a hydraulic transmission 110 which is an alternative embodiment of the invention. Transmission 110 includes substantially same components as transmission 10, the major difference between the embodiment being in the manner in which the swash plates and pumps are related to the input and out shafts. Normally transmission 110 transfers power in a variable ratio from an engine driven input shaft 112 to an output shaft 114.

The input shaft 112 connects centrally with an integral swash plate 116 which forms the end portion on the input side of the transmission. Shaft 112 extends centrally through almost the entire length of the transmission. The configuration of swash plate 116 is identical to that of the swash plate 16 which as described previously in connection with the first embodiment. Plate 116 thus presents a pair of relatively angled cam surfaces on its inner face. A cylindrical housing section 120 for the input side of the transmission is formed integrally with swash plate 116 in extension from the periphery thereof. Section 120 is concentric with shaft 112.

Within housing section 120, a rotor 122 is mounted on the input shaft 112 and is supported for rotation relative thereto by a pair of bearings 123. Rotor 122 serves as a hydraulic pump housing on the input side of transmission 110. Six uniformly spaced cylinder bores 126 are formed in rotor 122 from the right end thereof and are arranged in a circular pattern which is centered at shaft 112. Each bore 126 is cylindrical with its axis oriented parallel to shaft 112. A piston 128 is received in each bore for reciprocating movement therein. A compression spring 129 is fit in a large cavity which is formed in the back portion of each piston 128. Springs 129 thus continuously urge pistons 128 to the right as viewed in FIGS. 6 and 7.

The end of each piston 128 which projects out of its bore is provided with a neck portion 128a which carries an integral ball 128b on its end. Each ball 128b in turn flexibly carries a friction shoe or pad 130 which has a socket that receives the ball. Due to the ball and socket connection, each pad 130 is able to rotate and to flex in all directions as it moves along swash plate 116. Each pad 130 has a flat, circular, low friction surface that is able to ride along the cam surfaces of swash plate 116.

A stabilizing ring 132 interconnects the six friction pads 130 in a manner to orient them properly for movement into contact with swash plate 116. A thin annular groove is formed around each pad approximately midway between its low friction surface and its socket. Ring 132 has six generally wedge shaped openings (not shown) which are similar to openings 32a (FIG. 5) and which register with the respective grooves in order to connect the ring with each of the pads. The fit between the grooves and openings is sufficiently loose to permit the pads to wobble or flex about balls 128b and also to rotate relative to the ring. Ring 132 is constructed identically to the ring 32 described in connection with the first embodiment of the invention, and its function is the same.

A control lever 134 is operatively coupled with each piston 128 in a manner to control its stroke length. Each lever has an elongate base portion 134a which is received to slide in a guide channel 136 which is formed in rotor 122. Channels 136 are parallel to shaft 112 and are located outwardly of the respective bores 126. An arm portion 134b of each lever extends inwardly at a right angle from the end of each base 134a. Arms 134b are loosely received in traverse openings 138 which are formed through pistons 128 at the base areas of their necks 128a. a small compression spring 140 is fit in a recess of each piston, and the springs act against arms 134b to continuously urge each control lever 134 to the right as viewed in FIGS. 6 and 7. Springs 140 are stronger than springs 129 to facilitate downshifting of the transmission. Again, arms 134b may be alternatively constructed in a manner to encircle the piston necks 128a.

A control sleeve 142 is slidably supported within housing section 120 outwardly of shaft 112 and concentrically therewith. The outermost end of sleeve 142 is received in a groove 116b which is formed in plate 116 near its juncture with housing section 120. The innermost end of sleeve 142 contacts short stubs 134c which are formed on levers 134 as outward continuations of arms 134b. Sleeve 142 limits the extent to which levers 134 can move to the right, and the stroke length permitted each piston 128 is restricted accordingly. As previously suggested, sleeve 142 may be controlled as to its position in any suitable manner.

A relief passage 148 leads outwardly from each bore 126 to the exterior of rotor 122. Elongate valve rods 150 are mounted to slide in channels 152 that intersect with passages 148. Each rod 150 ordinarily blocks its passage 148 to flow as shown in FIG. 6, being biased toward the closed position by a compression spring 154 which encircles the rod and bears against its enlarged head portion 150a. Each rod has a reduced diameter portion 150b, and the rods may be slid against the force of springs 154 to the position shown in FIG. 7 wherein portions 150b register with passages 148. The relief passages 148 are then open so that fluid is able to flow out of bores 126.

Rods 150 are adjusted between the open and closed positions by a sleeve 156 which is fit against the cylindrical inner surface of housing section 120 outwardly of sleeve 142. One end of sleeve 156 is received in groove 116b, and the other end of the sleeve has an inturned flange 156a which engages the heads of 150a of the valve rods. Sleeve 156 is concentric with shaft 112 and is able to slide in a direction parallel to the shaft axis in order to move the rods 150 between their open and closed positions. The positions at which sleeve 156 is held may be controlled in any desired manner.

The output shaft 114 extends through a central opening formed in a circular left end plate 157 of the transmission. Plate 157 is formed integrally with a cylindrical housing section 160 that is equal in size to housing section 120. A bearing 162 rotatably supports shaft 114 relative to end plate 157, and an o-ring 164 provides a seal therebetween. Housing sections 120 and 160 are rigidly connected end to end with mating lugs 120a and 160a of the respective housing sections attached by conventional fastening elements 168 (FIG. 8). The two housing sections 120 and 160, the input side swash plate 116, and the input shaft 112 are thus all rigidly connected for rotation together.

A swash plate 158 for the output side of the transmission is formed integrally with the output shaft 114. The configuration of swash plate 158 is identical to that of the plate 58 described earlier in connection with the first embodiment. Plate 158 is located within housing section 160 and is adjacent to the interior surface of plate 157. An integral sleeve 163 is formed to extend from the inner face of swash plate 158 and is large enough to fit around the left end portion of the input shaft 112. Bearings 165 are fit within the opposite end positions of sleeve 163 in order to allow relative rotation between the sleeve and shaft 112. A circular valve plate 166 is formed integrally with the right end of sleeve 163. A similar valve plate 167 is mounted rigidly to shaft 112 by keys 169 (FIG. 6). Plates 166 and 167 are adjacent to one another and are rotatable relative to one another.

The hydraulic pump housing on the output side of transmission 110 comprises a rotor 172 which is identical to rotor 122 but oriented oppositely. Rotor 122 has a semicircular flange 122a on its end which mates with a similar flange 172a of rotor 172. The flanges are thus interlocked to interlock rotors 122 and 172 for rotation together. Rotor 172 is mounted on sleeve 163 and is supported for rotation relative thereto by a pair of bearings 175. Six cylindrical bores 176 extend into rotor 172 from the left end thereof, and a piston 178 is received in each bore for reciprocating movement. Bores 176 are parallel with shaft 114 and are located in alignment with the corresponding bores 126 of the input side pump.

Each piston 178 has a neck portion 178a which is provided with an integral ball 178b on its end. Each ball 178b in turn carries a friction pad 180 which has a socket that receives the ball. Pads 180 are able to rotate about the ball and socket connection and to flex in all directions as their flat contact surfaces move along the cam surfaces of plate 158. Pads 180 are coupled together by a resilient stabilizing ring 182 which is identical to the stabilizing rings described previously and which functions in essentially the same manner.

The two pumps are disposed in a closed hydraulic circuit such that fluid displaced from one pump is forced into the other pump. Included in this hydraulic circuit are discharge passages 184 which lead from each of the bores 126. Intake passages 186 lead through rotor 172 from bores 176 and are aligned with corresponding passages 184, although the plate valves 166 and 167 are located therebetween. Each bore 176 has a discharge passae 188 that is aligned with an intake passae 190 of the corresponding input side bore 126. Passages 188 and 190 are located outwardly of passages 184 and 186.

Passages 184 angle inwardly toward the transmission axis as they extend away from bores 126. A check valve comprising a valve ball 192 and spring 194 is located in each passage 184 to prevent fluid from entering bores 126 through the discharge passages thereof. Springs 194 urge balls 192 to the right toward their valve seats, although the fluid pressure in bores 126 unseats the balls during the compression strokes of pistons 128.

The plate valves 166 and 167 control the pattern of fluid flow between the input and output pumps. A pair of inner arcuate openings 166b are formed through valve plate 166 at locations to register with corresponding arcuate openings 167b formed through valve plate 167 when the plates are in suitable rotative positions relative to one another. Openings 166b and 167b each extend through an arc slightly less than 90°, with the arcs centered at diametrically opposed locations on the plate valves.

A pair of curved grooves 166d are formed in the surface of plate 166 which abuts plate 167. Grooves 166d extend only partially through plate 166 (see FIG. 6). The grooves extend between the ends of the openings 166b such that the openings and grooves cooperate to extend in a full circle. A similar pair of grooves 167d (FIG. 6) are provided in the abutting face of plate 167 to cooperate with openings 167b in forming a full circle. Fluid is able to flow from the input side pump to the output side pump whenever one of the openings 167b registers with one of the passages 184. If openings 167b and 166b are in registration, the fluid is able to flow directly through them from passage 184 into passage 186. If there is no opening 166b in registration with the opening 167b which is aligned with passage 184, the fluid which flows through passage 184 and opening 167b enters the grooves 167d and 166d and flows therein until it reaches one of the openings 166b, from where it is able to enter one of the bores 176 through its intake passage 186.

A second pair of arcuate openings 166c are formed through plate 166 at locations outwardly of openings 166b and offset therefrom by 90°. A similar pair of openings 167c extend through plate 167 at locations corresponding to openings 166c. Openings 166c and 167c each extend through an arc slightly less than 90°, and the openings in each pair are centered at diametrically opposed locations on the plates.

The abutting surfaces of plates 166 and 167 are further provided with respective curved grooves 166e and 167e. These grooves extend between the ends of openings 166c and 167c, respectively. In much the same manner as described previously for grooves 166d and 167d, grooves 166e and 167e allow fluid to flow from the output side pump to the input side pump whenever one of the arcuate openings 166c is in registration with one of the passages 188 and opening 167c is is registration with passage 190. Passages 166f extend outwardly from openings 166c to provide access for additional fluid to the input pump when unshifting, and an escape for fluid from the output pump when downshifting.

The second embodiment shown n FIGS. 6-8 operates similarly to the first embodiment, although there are some differences due to the different manner in which the swash plates and pumps are related to the input and output shafts. When shaft 112 is driven (as by an engine), swash plate 116 is rotated to reciprocate pistons 128 due to the action of the cam surfaces against the pistons. The resultant pumping action of pistons 128 forces fluid from bores 126 of the input pump into bores 176 of the output pump. Consequently, pistons 178 are extended to interact with swash plate 158 in a manner that causes the output swash plate to rotate because the pistons push against its cam surfaces. The output shaft 114 is thus rotated since it is rigid with plate 158.

The transmission ratio again depends on the relative fluid displacement of the input and output pumps, which in turn depends on the position of sleeve 142 and levers 134 as discussed previously in connection with the first embodiment. The plate valves 166 and 167, check valves 192, pads 130 and 180, rings 132 and 182, springs 140, relief passages 148, valve rods 150, and the double cam surfaces of swash plates 116 and 158 all function in essentially the same manner as the corresponding components of the first embodiment. At the high setting of sleeve 142, the entirety of the transmission rotates as a unit, and there is no pumping action or fluid flow between the pumps since the pistons are effectively locked in place relative to the swash plates.

The transmission of the first embodiment has advantages as to simplicity of various components such as the plate valve 66. The second embodiment acts somewhat as a fly wheel in that its housing rotates directly with the input shaft 112 at all times. Ultimately, the transmission which is most advantageous will depend on the particular application or use to which it is to be put, or the environment in which it is to operate. In any event, substantial structural and operational advantages are achieved over existing transmissions of the hydraulic type.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A hydraulic transmission comprising:
   an input shaft adapted to be rotated;
   a first hydralic pump presenting a plurality of bores;
   pistons disposed for reciprocating movement in the respective bores of said first pump to displace hydraulic fluid therein;
   a first cam member for interaction with said pistons to effect reciprocating movement thereof, one of said first pump and first cam member being coupled with said input shaft for rotation therewith;
   a second hydraulic pump presenting a plurality of bores and arranged with said first pump in a substantially closed hydraulic circuit, whereby fluid displaced in each pump is directed to the other pump;
   pistons disposed for reciprocating movement in the respective bores of said second pump;
   valve means in said hydraulic circuit for controlling the fluid flow between said first and second pumps;
   a second cam member disposed to interact with the pistons of said second pump;
   a rotatable output shaft, one of said second pump and second cam member being coupled with said output shaft to effect rotational driving thereof; and
   control means independent of said first and second cam members for controlling the relative fluid displacement of said first and second pumps, thereby controlling the relative rotational speed of said input and output shafts.

2. The invention of claim 1, wherein said control means includes a mechanical linkage operatively linked to each piston of said first pump to restrict the stroke length thereof, said linkage being adjustable to vary the stroke length of each piston of said first pump, thereby varying the displacement capacity of said first pump.

3. The invention of claim 2, wherein said linkage includes an adjustable lever arm for each piston of said first pump in operative engagement therewith and a guide portion rigid with each lever arm, and including a plurality of guide channels which receive the respective guide portions for sliding movement to assist in retaining said lever arms in operative engagement with the respective pistons.

4. The invention of claim 3, including a control member operatively engaging said lever arms and supported for sliding movement to adjust said lever arms in a manner to vary the stroke length of each piston of said first pump.

5. The invention of claim 4, wherein said control member comprises a sleeve substantially concentric with said input shaft and slidable in the general direction of the axis thereof.

6. The invention of claim 2, wherein each piston of said first pump presents a recess and said linkage includes a plurality of levers loosely received in the recesses of the respective pistons of said first pump, and including a spring for each piston of said first pump located in the recess thereof between the piston and the corresponding lever, thereby facilitating movement of said levers in a direction in opposition to the hydraulic pressure exerted on the pistons of said first pump.

7. The invention of claim 1, wherein said valve means includes valve supported to rotate relative to said first pump, said plate valve presenting a plurality of arcuate openings for directing fluid between said first and second pumps.

8. The invention of claim 1, wherein said hydraulic circuit includes a fluid intake passage for each bore of said first pump to direct fluid thereto and a fluid discharge passage for each bore of said first pump to direct fluid therefrom, and including a check valve disposed in each discharge passage to substantially prevent fluid from entering said first pump through the discharge passages thereof.

9. The invention of claim 8, wherein each discharge passage has a portion oriented at an angle relative to said input shaft, and including seats for the check valves located in said portions of the discharge passages, whereby rotation of said first pump exerts forces on said check valves urging same toward their seats.

10. The invention of claim 1, wherein said first pump is coupled with said input shaft for rotation therewith and said second pump is coupled with said output shaft for rotation therewith, and including a housing for the transmission extending rigidly between said first and second cam members to rotate therewith.

11. The invention of claim 1, wherein said first cam member is coupled with said input shaft for rotation therewith and said second cam member is coupled with said output shaft for rotation therewith, said first and second pumps being coupled together to rotate in unison.

12. The invention of claim 11, including a housing for the transmission rigid with one of said cam members to rotate therewith.

13. The invention of claim 1, including:
a relief port for each bore of said first pump disposed to discharge fluid therefrom;
a valve associated with each relief port and operable to control the flow of fluid therethrough; and
means for operating said valves to relieve the hydraulic pressure in the bores of said first pump.

14. The invention of claim 13, wherein the means for operating said valves comprises a control sleeve supported for sliding movement to open and close said valves.

15. A hydraulic transmission comprising:
an input shaft adapted to be rotated;
a first hydraulic pump coupled with said input shaft for rotation therewith, said first pump presenting a plurality of bores with a piston disposed for reciprocating movement in each bore to displace hydraulic fluid therein;
a first cam member disposed to interact with the pistons of said first pump to effect reciprocating movement thereof in said bores;
an output shaft supported for rotation;
a second hydraulic pump coupled with said output shaft for rotation therewith, said second pump presenting a plurality of bores each of which receives a piston for reciprocating movement, said first and second pumps being arranged in a substantially closed hydraulic circuit whereby fluid displaced in each pump is directed to the other pump;
valve means for controlling the flow of hydraulic fluid between said first and second pumps;
a second cam member disposed to interact with the pistons of said second pump in a manner to rotate said output shaft, said first and second cam members being rigidly coupled to rotate together;
a lever for each piston of said first pump in operative engagement therewith to restrict the stroke length of said pistons; and
means for adjusting the position of each lever to vary the displacement of said first pump.

16. The invention of claim 15, including a housing for the transmission, said housing extending rigidly between said first and second cam members.

17. The invention of claim 16, wherein said valve means includes a plate valve disposed in said hydraulic circuit and rigidly coupled with said housing, said plate valve presenting a plurality of arcuate openings for directing fluid between said first and second pumps.

18. A hydraulic transmission comprising:
an input shaft adapted to be rotated;
a first cam member coupled with said input shaft for rotation therewith;
a first hydraulic pump presenting a plurality of bores with a piston disposed for reciprocating movement in each bore to displace hydraulic fluid therein, said first pump being disposed with its pistons interacting with said first cam member in a manner to effect reciprocating movement of said pistons in their bores;
a second hydraulic pump presenting a plurality of bores each of which receives a piston for reciprocating movement, said first and second pumps being arranged in a substantially closed hydraulic circuit whereby fluid displaced in each pump is directed to the other pump;
valve means for controlling the fluid flow between said first and second pumps;
an output shaft supported to rotate;
a second cam member coupled with said output shaft for rotation therewith, said second cam member interacting with the pistons of said second pump in a manner to effect rotation of said output shaft;
a lever for each piston of said first pump in operative engagement therewith to restrict the stroke length of said pistons; and
means for adjusting the position of each lever to vary the displacement of said first pump.

19. The invention of claim 18, wherein said first and second pumps are coupled together to rotate in unison.

20. The invention of claim 19, including a housing for the transmission, said housing being rigid with one of said first and second cam members to rotate therewith.

21. A hydraulic transmission comprising:
an input shaft;
a first hydraulic pump presenting a plurality of bores with a piston disposed for reciprocating movement in each bore to displace hydraulic fluid therein;
a first swash plate presenting a pair of cam surfaces oriented at an angle relative to one another, said cam surfaces being disposed to interact with said pistons in a manner to effect reciprocating movement thereof in said bores, one of said first swash plate and first pump being mounted for rotation with said input shaft;
a second hydraulic pump presenting a plurality of bores each of which receives a piston for reciprocating movement, said first and second pumps being arranged in a substantially closed hydraulic circuit whereby fluid displaced in each pump is directed to the other pump;
valve means for controlling the flow of fluid between said first and second pumps;
a second swash plate presenting a pair of cam surfaces oriented at an angle relative to one another, the cam surfaces of said second swash plate being disposed to interact with the pistons of said second pump;
an output shaft supported to rotate, one of said second swash plate and second pump being mounted on said output shaft to effect rotational driving thereof; and
means for controlling the relative fluid displacement of said first and second pumps to control the relative rotational speed of said input and output shafts.

22. The invention of claim 21, wherein the cam surfaces of said first and second swash plates are substantially flat surfaces.

23. The invention of claim 21, wherein said first and second swash plates each have a circular periphery and the cam surfaces of each swash plate intersect on a diameter of said periphery.

24. The invention of claim 21, wherein said first pump is mounted on said input shaft for rotation therewith and said second pump is mounted on said output shaft for rotation therewith, and including a housing for the transmission extending rigidly between said first and second swash plates.

25. The invention of claim 21, wherein said first swash plate is mounted on said input shaft for rotation therewith and said second swash plate is mounted on said output shaft for rotation therewith, said first and second pumps being coupled together for rotation in unison.

26. The invention of claim 15, including a housing for the transmission, said housing being rigid with one of said first and second swash plates to rotate therewith.

27. The invention of claim 21, including:
- a pad for each piston for said first pump, each pad presenting a contact surface for engagement with said first swash plate;
- means flexibly coupling said pads with the respective pistons of said first pump to accommodate movement of said contact surfaces along the cam surfaces of said first swash plate; and
- stabilizing means coupling said pads together in a manner tending to orient adjacent pads similarly, thereby positioning pads that are out of contact with said first swash plate in an orientation to move smoothly into contact therewith.

28. The invention of claim 27, wherein said stabilizing means comprises a resilient ring coupled with each pad, the resiliency of said ring acting to orient the pads that are out of contact with said first swash plate generally in accordance with the adjacent pads.

* * * * *